April 28, 1931. A. GRAVELLE 1,802,466
TIRE PUMP FOR AUTOMOTIVE VEHICLES
Filed May 28, 1930
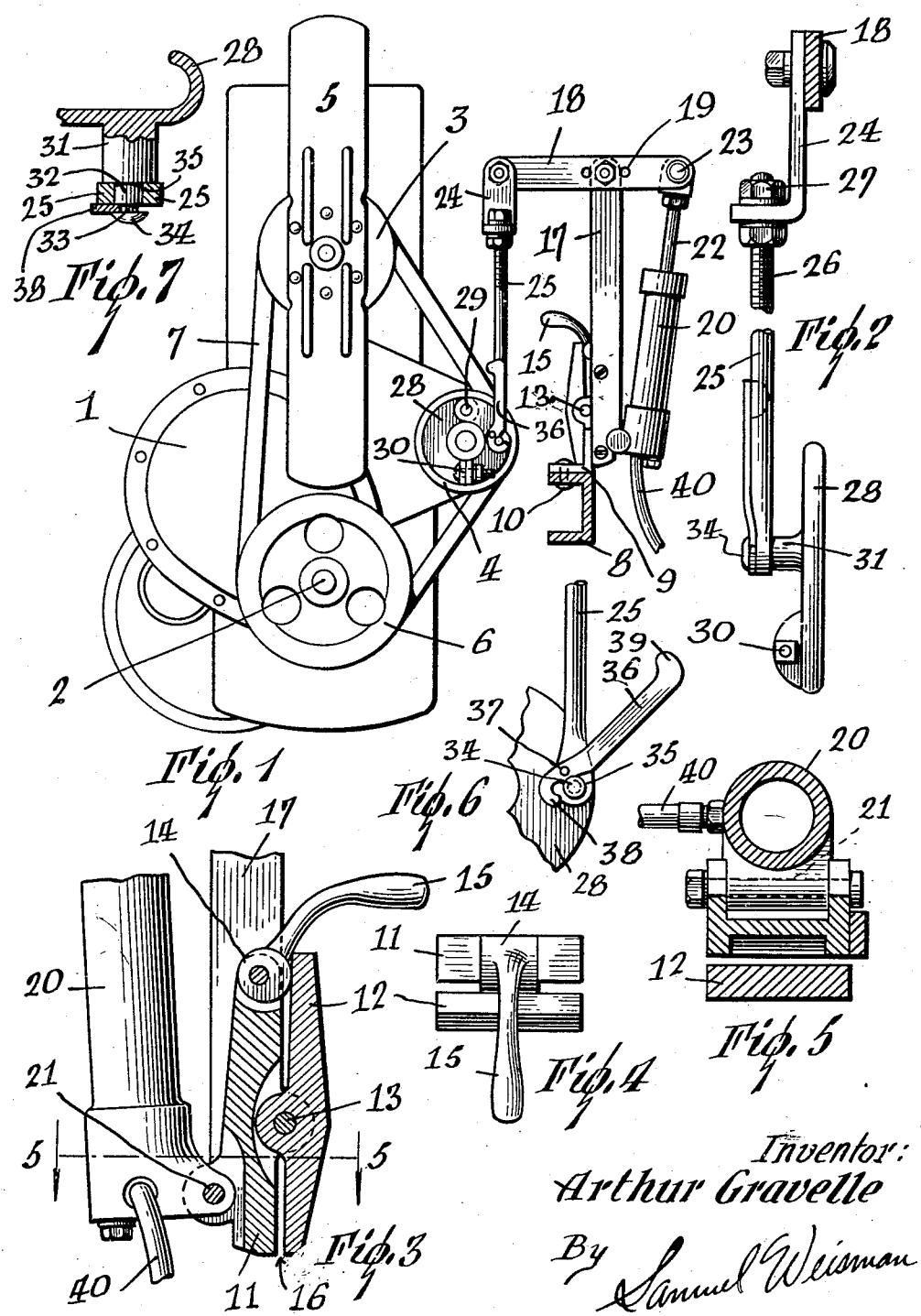
Inventor:
Arthur Gravelle
By Samuel Weisman
Attorney Patented Apr. 28, 1931

1,802,466

UNITED STATES PATENT OFFICE

ARTHUR GRAVELLE, OF WILSON'S CORNERS, QUEBEC, CANADA

TIRE PUMP FOR AUTOMOTIVE VEHICLES

Application filed May 28, 1930. Serial No. 456,514.

The present invention pertains to a novel pump for automobile tires, and the principal object of the invention is to provide a device of this character which may be readily attached to the automobile chassis and driven from the motor, so that the motor is employed to furnish the compressed air to be charged into the tire.

With this object in view the invention comprises a post or fixture that may readily be clamped to the chassis of the vehicle. The post carries a rocker arm and a pump, and one end of the rocker arm is connected to the piston rod of the pump. The other end of the rocket arm is equipped with linkage which is adapted for eccentric connection to one of the radiator members of the motor, such as the generator pulley. After this connection has been made and the motor started, the rocker arm is oscillated and the pump is operated to deliver air through a hose connection to the tire valves.

The invention is fully disclosed by way of example in the following description and in the accompanying drawing in which Figure 1 is a front elevation of the apparatus;

Figure 2 is a side elevation of the pump actuating mechanism;

Fig. 3 is a detail vertical section of the clamp;

Fig 4. is a detail plan view of the clamp;

Fig. 5 is a section on the line 5—5 of Fig. 3;

Fig. 6 is a detail front elevation, showing the manner of connecting the pump mechanism to the generator pulley, and Fig. 7 is a detail section of this connection.

Reference to these views will now be made by use of like characters which are employed to designate corresponding parts throughout.

In Figure 1 is illustrated an automobile 1 of conventional type, having a crank shaft 2, a fan pulley 3 and a generator pulley 4. The fan pulley 3 carries a fan blade 5 in the usual manner, while the crank shaft 2 is also provided with a pulley 6. A belt 7 is passed over the pulleys 3, 4 and 6 so that the entire train is driven from the crank shaft 2.

A side of the chassis of the vehicle is illustrated in section in Fig. 1 and designated by the numeral 8. Upon the chassis is secured a bracket 9 by means of a rivet 10.

In order to secure the pumping mechanism to the chassis, there is provided a clamp consisting of a rigid member 11 and a rocking or movable jaw member 12 pivotally attached to the member 11 by a pin 13. At the upper end of the member 11 is pivotally mounted, an eccentric or cam 14 having an operating finger 15 extending therefrom. When the rise of the cam is in engagement with the movable jaw 12 as illustrated in Fig. 3, a narrow space 16 remains between the lower ends of the jaws, but this space is of less width than the thickness of the bracket 9. Consequently the clamp may be slipped over the bracket to receive the same in the space 16 when the latter is enlarged by adjustment of the cam, and when the latter is readjusted to the position shown in Fig. 3 the space 16 contracted, whereby the clamp is securely fastened to the bracket 9.

To the rigid member 11 of the clamp is secured a post 17 having a rocker arm 18 pivotally mounted on the upper end thereof. The arm has a series of apertures 19 in the center portion thereof to provide various points of attachment to the post 14, any one of which points may be selected in accordance with the relation of the automobile parts.

To the lower end of the member 11 is pivotally attached a pump cylinder 20 by means of a pivot pin 21. A piston rod 22 extends through the upper end of the pump and is pivotally attached at 23 to the adjacent end of the rocker arm.

To the remaining end of the arm 18 is secured an angle piece 24 through which is passed the threaded end of a rod 25. The threaded end 26 may be adjusted and secured in the bracket by means of nuts 27 as shown more clearly in Fig. 2.

To the hub of the generator pulley 4 is attached a collar consisting of a pair of like semi-circular parts 28 pivoted together at one end as at 29 and bolted together at the remaining ends as at 30. From one of the sections of the collar extends a stud 31 having a neck 32 and a further reduced portion 33 followed by a head 34 of substantially the same diameter as the neck 32. The lower end of the connecting rod 25 is apertured at 35 to slip over the head 34 and upon the neck 32. In order to maintain the end in this position, a latch member 36 is pivotally attached to the connecting rod 25 at 37 and formed with a hooked end 38 adapted to be swung into position to engage the reduced end 33 as shown more clearly in Fig. 7. The upper end of the latch member is formed with a curved lip 39 adapted to fit around the rod 25. The latch member is made of spring material so that the lip 39 may be brought to the position shown in Fig. 2, whereupon the rod 25 is securely locked to the stud 31.

The lower end of the pump barrel 20 has an outlet hose 40 which may be attached to the tire valve in the usual manner.

In the use of the device it will be apparent that the clamp may be readily attached to the bracket 9 which may be permanently secured to the chassis 8. It is then only necessary to apply the collar 28 to the hub of the pulley 4 and connect the rod 25 to the stud 31 in the manner already described. The operation of the motor obviously turns the pulley 4 and rocks the arm 18, whereupon the pump 20 is actuated to force air under pressure through the hose 40.

Although a specific embodiment of the invention has been illustrated and described, it will be understood that various alterations in the details of construction may be made without departing from the scope of the invention as indicated by the appended claims.

What I claim is:—

1. A pumping mechanism for motor driven vehicles comprising a post, a rocker arm pivotally mounted on one end thereof, anchoring means at the other end of said post for securing the same to a motor vehicle, a connecting rod depending from one end of said rocker arm, a collar adapted for attachment to a rotary part of the automobile mechanism, means for attaching said rod to said collar, a pump barrel pivotally attached to said post, a piston rod extending through one end of said barrel and pivoted to the remaining end of said rocker arm, and an outlet hose extending from the other end of said barrel.

2. A pumping mechanism for motor driven vehicles comprising a post, a rocker arm pivotally mounted on one end thereof, anchoring means at the other end of said post for securing the same to a motor vehicle, a connecting rod depending from one end of said rocker arm, a collar adapted for attachment to a rotary part of the automobile mechanism, a stud extending from said collar, said rod having an aperture adapted to receive said stud, a latch carried by said rod for retaining the rod on said stud, a pump barrel pivotally attached to said post, a piston rod extending through one end of said barrel and pivoted to the remaining end of said rocker arm, and an outlet hose extending from the other end of said barrel.

In witness whereof I have hereunto set my hand.

ARTHUR GRAVELLE.